United States Patent Office 3,313,716
Patented Apr. 11, 1967

3,313,716
METHOD FOR MANUFACTURING METAL-COATED GASKETS AND THE LIKE
Karl J. Pschera, Huntsville, Ala., assignor to the United States of America as represented by the Secretary of the Army
No Drawing. Filed Jan. 29, 1964, Ser. No. 341,140
7 Claims. (Cl. 204—38)

The instant application is a continuation-in-part of application Ser. No. 244,844 now Patent No. 3,132,870.

This invention may be manufactured or used by or for the Government for governmental purposes without the payment of any royalty thereon.

The present invention relates to a method for providing soft-metal coatings on non-electrical conducting surfaces. Particularly, the invention concerns a method for providing soft metal coatings on spiral wound metallic gaskets of the type shown in applicant's copending application Serial No. 244,844 filed Dec. 14, 1962, now Patent No. 3,132,870.

The problem of hot gas leakage at the flanges of pipes, tubing, containers, and the like has existed for some time. Hot gases generally are above atmospheric pressure and this factor further complicates the leakage problem. A particularly troublesome area in which hot gas leakage has become a serious problem is in the field of rocket engines, especially at the turbine manifold-to-exhaust duct flange.

One answer to the problem has been the use of spiral-wound metallic gaskets. Examples of such gaskets are found in U.S. Patents 1,829,709 and 2,457,694. Essentially, these gaskets comprise thin metal strips spirally wound with non-metallic, compressible packing material interposed between the several convolutions of the metal spiral. When such gaskets are employed to seal flanges against the leakage of hot fluids, the compressible material should be of a heat-resistant nature such as asbestos, spun glass, or other ceramic material.

The most satisfactory spiral wound metallic gaskets are those in which the metallic spiral winding is stainless steel and the compressible filler is asbestos. However, even gaskets of this type fail to accomplish absolute sealing off of hot gases with any degree of dependability, especially at the turbine manifold-to-exhaust-duct flange of rocket engines where, in addition to the heat, there is also high pressures. At elevated temperatures the stainless steel metal loses its spring qualities thus impairing its sealing ability. Moreover, the mechanical bite between the stainless steel spiral and the flange surface, even a stainless steel flange, is reduced with rising temperature.

In the above mentioned parent application, applicant describes in detail improved spiral wound metallic gaskets which seal the flanges of pipes, tubes and the like used to conduct fluids having a temperature in the range of about 25° C. to about 900° C. and at superatmospheric pressure. Essentially, the improved gaskets consist of a spiral wound metallic gasket having a smooth, even layer or coating of soft metal affixed to the side surfaces. The soft metal improves the mechanical bite and the knife edge pressure seal between the metallic gasket spiral and the flange surfaces.

However, the improved spiral wound metallic gasket presented a problem itself as to a satisfactory method for applying a soft metal coating to its side surfaces. Since the material interposed between the spiral metal windings is a non-conductor, straight forward electro-plating of the soft metal on the gasket side surfaces was impossible. It was found that if both side surfaces of the gasket were treated with a metal-resinate solution which was subsequently decomposed with the volatilization of all organic material, there would be deposited on the side surfaces a thin metal coating which could serve as a conductor for the electrodeposition of additional metal on the entire side surfaces of the gasket.

In accordance with the foregoing, it is an object of the present invention to provide a method for affixing soft metals to the side surfaces of spiral-wound metallic gaskets as well as the surfaces of other non-electrical conducting materials.

A further object of the instant invention is to provide a method for depositing a thin base layer of soft metal on the entire side surface of spiral-wound metallic gaskets in order that additional soft metal can be electrodeposited on the base layer by conventional electrodeposition techniques.

The manner in which these as well as other objects can be accomplished will become apparent from the following detailed description of the instant invention.

As mentioned earlier, the manufacture of soft metal coated spiral wound metallic gaskets involves the problem of providing a method for depositing the soft metal on the non-conducting compressible material as well as the metal strips. Conventional electroplating techniques are not satisfactory since the non-conducting material would not be plated. Electroplating of the exposed edges of the stainless steel spiral is possible. However, the structure of electrodeposits on metal edges is not uniform and in most cases has coarse crystallinity. Coarse crystals grown perpendicular to the gasket face without side support collapse under pressure and, therefore, would not provide sealing.

This problem is obviated by applying a soft-metal organic resinate solution to the side surfaces of the gasket. Application of the soft-metal resinate can be accomplished through any conventional technique such as spraying, dipping, or painting, though spraying is preferred. To provide a thin baselayer of soft metal over the entire side surfaces, the whole surface must be completely covered with the resinate. There is usually no detrimental effect from coating the inner and outer peripheral surface of the gasket with the resinate although, if desired, these edges may be protected from the resinate application by masking. Preferably at least the inner peripheral surface of the gasket is protected to prevent depositing the metal-resinate on the inner edge. After the resinate coating is applied and dried, the coated gasket is heated in the presence of oxygen (air, for example) to decompose the resinate and volatilize all organic matter thus leaving a thin layer or coating of metal deposited on the entire side surfaces of the gasket. Additional heating for a short period of time stabilizes the metal deposit.

Depending on the metal content of the resinate solution, the soft metal layers will vary in thickness. Generally, the metal resinate solution will contain from about 8% to about 25% by weight metal. Resinate containing more than 25% metal could be used since they would produce thicker coatings with each application. However, at present no resinates containing more than 25% metal are commercially available. Resinates containing less than 8% metal are operable but they require many applications to build up a really satisfactory metal base. With resinates containing about 24% metal, a thin layer of metal on the order of about 0.0001 inch is deposited with each application upon decomposition of the resinate solution. The metal resinate treatments are repeated until a layer of sufficient thickness to provide a good base for electroplating is achieved, usually a thickness of about 0.0003 inch to about 0.0004 inch is desirable. The gasket is usually allowed to cool to about room temperature (about 20° C. to 25° C.) before applying another coating of resinate solution because of the volatility of the solvents in the resinate solution. Otherwise uneven coatings could result.

The temperature at which the resinate is decomposed depends upon the particular resinate solution. Manufacturers of the various metal resinates distribute such information with their respective products. However, practically all metal resinates will completely decompose and the organic materials voltilize when heated in the presence of air at a temperature within the range of about 300° C. to about 500° C. for a time interval of about three to fifteen minutes. After the resinate has been decomposed and the organic material volatilized, the metal deposit is stabilized by heating it at a temperature of about 380° C. to about 450° C. for an additional three to four minutes. The stabilization of the metal does not have to be carried out as a continuing part of the resinate decomposition step. In other words, after the metal resinate is decomposed and the organic materials volatilized the gasket may be allowed to cool and subsequently reheated to stabilize the metal. Moreover, the stabilization step need not be conducted in the presence of oxygen. Stabilization results in a stronger adherence of the metal deposit to the side surface of the gaskets.

There is nothing critical about the composition of the metal resinates themselves as long as they readily decompose at temperatures up to about 500° C. with the subsequent volatilization of all organic material. This is inclusive of all gold, silver, and platinum resinates now commercially available. A representative example of a commercially available organic metal resinate is Liquid Bright Gold RHC Hanovia Division of Englehardt Industries. There are, of course, many others.

A typical 24% silver resinate solution decomposes readily at 400° C. and after all volatile matter is evolved (usually three to fifteen minutes depending on the amount of oxygen present and the thickness of the resinate coating) the metal deposit is easily stabilized by continued heating at this temperature for an additional three to four minutes. While other metal resinates are operable, gold-resinate solutions and silver-resinate solutions are preferred.

Another obvious factor which affects the thickness of the metal layers deposited by the resinate applications is the extent of dilution, if any, of the resinate solution. To achieve suitable consistency for spraying or painting, the addition of an inert, volitile, organic solvent such as amyl acetate or carbon tetrachloride may be required. This dilution obviously reduces the percentage of metal in a given amount of resinate.

After a sufficient thickness of base metal is achieved, additional soft metal is deposited on the gasket by conventional electrodepositing techniques until the soft metal layers on each of the side surfaces of the gasket has a total thickness of about 0.003 inch. This thickness is not absolutely critical since sealing is accomplished when the thickness of soft metal is less than (for example 0.001 inch) a more than (up to about 0.01 inch). However, experience shows that extremely reliable performance is obtained when the soft metal coating is about 0.003 inch to about 0.004 inch.

The soft metal is easily electrodeposited on the base metal by passing an electric current through an aqueous solution of a water-soluble salt of the desired soft metal, using the base metal on the side surface of the gasket as the cathode. There are many art-recognized metal salts used in electroplating techniques (silver nitrate, copper sulfate, and the like) and no elaborate discussion of these salts or of electroplating itself is required here. The soft metal thus electrodeposited are slightly harder than the pure annealed metal.

The gasket can be electroplated with any desired soft metal such as copper, silver, gold, and platinum according to the process of the invention. Moreover, the base metal deposited by the metal-resinate applications can differ from the metal which is electrodeposited on the base metal (within the limitations of the natural electropotential of metals). For example, silver can be electroplated on a silver base or a gold base but gold cannot be deposited on a silver base.

In selecting soft metals, their metallurgical properties should be evaluated in the light of the particular sealing problem at hand. Copper tends to oxidize at high temperatures and its hardness increases as a result of the hydrogen content of electrodeposited coatings of the metal. In addition to its cost, gold is not quite as desirable as silver since its ability to flow and to recover is somewhat less than that of silver. The physical properties of these soft metals are well known and the choice of the proper metal for the particular circumstances is well within the skill of the art.

The preferred embodiment of the present method is that wherein a thin coating of silver is deposited on the side surfaces of a stainless steel-asbestos spiral wound metallic gasket by first depositing a thin base layer of silver from a silver resinate solution and subsequently electrodepositing additional silver on this base layer. Silver exhibits very good plasticity thus providing the necessary "bite" for the metal spiral. The recovery rate of silver at room temperature is good and, at elevated temperatures, silver does not oxidize. The flow of the metal is sufficient to fill small cavities and pores created by temperature stresses while its excellent heat conductivity contributes to temperature equalization in the gasket. Silver is compatible with asbestos and yet wets the asbestos sufficiently to provide good adherence. The wetting properties of silver on stainless steel are sufficient but silver does not form alloys at the stainless steel-silver interface. Thus, the gasket thereby produced does not contaminate the flange face and it may be removed and replaced (that is the gasket can be reused without loss of effectiveness).

An improved soft metal coated spiral wound metallic gasket of the type claimed in the above mentioned parent application (stainless steel spiral-asbestos compressible material) was prepared according to one of the following methods.

(a) A 24% gold resinate solution was sprayed on both side surfaces of the spiral wound gasket and allowed to dry. The gasket was then placed in an oven preheated to a temperature of about 380° C. and maintained at a temperature range of 380° C. to about 450° C. for fifteen minutes during which time the oven door was left about half-open to admit air. At the end of fifteen minutes the door was closed and the gasket heated at the same temperature range for four minutes to stabilize the metal deposit. Then the gasket was removed from the oven and allowed to cool to room temperature. This procedure was repeated three more times giving a total thickness of base layer of about 0.0004 inch. This base layer was electroplated with additional gold to give a total thickness of about 0.004 inch.

(b) The side surfaces of another gasket were coated with a 24% silver resinate solution and treated according to the same procedure set forth in (a). After four silver-resinate treatments, gold was electroplated on the side surfaces of the gasket to a thickness of about 0.003 inch.

(c) The side surfaces of another gasket was treated with a 24% silver resinate solution according to the same procedure set forth in (a). After the silver base layer was formed, additional silver was electrodeposited on the gasket giving a total thickness of silver on each side of the gasket of about 0.003 inch.

Actual tests of soft metal coated spiral wound metallic gaskets produced by the present invention showed that they would prevent gas leakage at flange joints when the temperature of the gases passing through the flange varied from 25° C. to 900° C.

The above description is for purposes of illustration only and no undue limitation of the invention is intended thereby except as reflected in the appended claims.

I claim:

1. A method for applying a soft metal coating on each of the side surfaces of a compressible gasket which gasket comprises a thin metal strip of uniform width wound into a spiral, a layer of heat resistant compressible material interposed between the several convolutions of said spiral, and each of the side surfaces of said spiral and said compressible material lying in a common plane; said method comprising:

(a) Applying to the side surfaces of said gasket a metal resinate solution of a soft metal;
   (b) Heating said gasket in an oxidizing atmosphere to decompose the resinate and to volatilize the organic material therein whereby a thin base layer of soft metal is deposited on said side surfaces;
   (c) Continuing the heating to stabilize the thin layer of metal;
   (d) Repeating steps (a) through (c) until said thin layer of metal is of sufficient thickness to form a thin base layer of metal for electrodepositing additional soft metal;
   (e) Electrodepositing on said thin base layer of metal additional soft metal.

2. The method according to claim 1 wherein said metal resinate solution is a gold resinate solution.

3. The method according to claim 2 wherein said soft metal electrodeposited on said thin layer of metal is silver.

4. The method according to claim 3 wherein said thin metal strip is stainless steel and said compressible material is asbestos.

5. The method according to claim 1 wherein said metal resinate solution is a silver resinate solution.

6. The method according to claim 5 wherein said soft metal electrodeposited on said thin base layer of metal is silver.

7. The method according to claim 6 wherein said thin metal strip is stainless steel and said compressible material is asbestos.

References Cited by the Examiner

UNITED STATES PATENTS

| | | | |
|---|---|---|---|
| 1,547,408 | 7/1925 | Buisson | 204—30 |
| 2,667,427 | 7/1951 | Nolte | 117—22 |
| 2,996,401 | 8/1961 | Welch et al. | 117—22 |
| 3,132,870 | 5/1964 | Pschera | 277—204 |

JOHN H. MACK, *Primary Examiner.*

W. VAN SISE, *Assistant Examiner.*